US008881770B2

(12) United States Patent
Wu

(10) Patent No.: US 8,881,770 B2
(45) Date of Patent: Nov. 11, 2014

(54) QUICK CONNECTOR HAVING CHECK DEVICE

(71) Applicant: Shang-Neng Wu, Pingzhen (TW)

(72) Inventor: Shang-Neng Wu, Pingzhen (TW)

(73) Assignee: Air Kinetic Technologies Corp., Taoyuan County (TW)

( * ) Notice: Subject to any disclaimer, the term of this patent is extended or adjusted under 35 U.S.C. 154(b) by 168 days.

(21) Appl. No.: 13/622,156

(22) Filed: Sep. 18, 2012

(65) Prior Publication Data

US 2013/0074964 A1 Mar. 28, 2013

(30) Foreign Application Priority Data

Sep. 23, 2011 (TW) ............................ 100134250 A

(51) Int. Cl.

| | |
|---|---|
| ***F16K 15/14*** | (2006.01) |
| ***F16K 15/20*** | (2006.01) |
| ***F16L 37/113*** | (2006.01) |
| ***F16L 37/38*** | (2006.01) |

(52) U.S. Cl.

CPC ............... *F16L 37/113* (2013.01); *F16L 37/38* (2013.01)

USPC ....................................... 137/854; 137/234.5

(58) Field of Classification Search

USPC ........ 137/223, 231, 234.5, 515, 515.3, 515.5, 137/515.7, 854

See application file for complete search history.

(56) References Cited

U.S. PATENT DOCUMENTS

| | | | | |
|---|---|---|---|---|
| 3,626,978 | A * | 12/1971 | Hoekstra | 137/854 |
| 5,766,451 | A * | 6/1998 | Sparling | 210/136 |
| 2008/0277610 | A1* | 11/2008 | Bahner et al. | 251/148 |

* cited by examiner

*Primary Examiner* — Eric Keasel
*Assistant Examiner* — Hailey K Do
(74) *Attorney, Agent, or Firm* — Chun-Ming Shih

(57) ABSTRACT

A quick connector having a check device includes an outer body, a locking member, an engaging ring, an inner body and an outer locking member. The inner body has a protrusion at one end thereof and an opening next to the protrusion. The protrusion is connected with a membrane member. The membrane member has a central through hole for insertion of the protrusion and a membrane sheet adapted to cover the opening. The membrane member provides a one-way function for air flow. When air flows reversely, the membrane member will cover the opening to provide a check function.

9 Claims, 6 Drawing Sheets

1
11
15
12
14
13
2
20
22
21
3
31
45
451
452
44
43
42
4
47
46
48
41
5
521
51
52
53
6

1
14
12
42
45
452
43
3
2
4
5
6

QUICK CONNECTOR HAVING CHECK DEVICE

BACKGROUND OF THE INVENTION

1. Field of the Invention

The present invention relates to a quick connector, and more particularly, to a quick connector having a check device for one-way flow.

2. Description of the Prior Art

A conventional air cushion bed comprises air valves to connect with a plurality of air pipes for air bags, so that the air cushion bed is able to exhaust air and to exchange fresh air. In the past, a fastening belt is used to connect the air pipe and air bag. This fastening belt consumes much time and doesn't have aesthetic. After a period of time, the fastening belt may break to cause the malfunction of the product to influence the goodwill of the manufacturer. If the air pipe is damaged and needs maintenance or replacement, the conventional connection structure cannot be disassembled with ease. It is necessary to improve the structure.

Besides, the air pipe of the air cushion bed needs an air check function. The conventional structure uses a check valve having a spring and a ball valve to achieve the check function. However, after a period of time, the spring may malfunction because of elastic fatigue or displacement. Noise is created when the check valve is closed. Furthermore, the external connection structure is not pleasing to the eye. Accordingly, the inventor of the present invention has devoted himself based on his many years of practical experiences to solve these problems.

SUMMARY OF THE INVENTION

The primary object of the present invention is to provide a quick connector having a built-in check device, which has aesthetic and can be operated exactly and won't malfunction easily and is cost-effective.

Another object of the present invention is to provide a quick connector having a check device, which can be assembled quickly.

A further object of the present invention is to provide a quick connector having a check device, which can block air from flowing back.

A further object of the present invention is to provide a quick connector having a check device, which can prevent any unexpected disengagement.

In order to achieve the aforesaid objects, the quick connector of the present invention comprises an outer body, a locking member, an engaging ring, an inner body and an outer locking member.

The outer body has a press portion at a bottom thereof. The outer body has a passage therein. The passage has an L shape. Two ends of the passage are a first connection opening and a second connection opening. The outer body has an annular groove close to an outer edge of the first connection opening and a rib at the bottom of the outer body next to the second connecting opening.

The locking member has a space therein and a locking block in the space. Preferably, the locking member has two locking blocks. The locking member further has a stop ring at an inner edge of the space.

The engaging ring is disposed in the annular groove of the outer body. The engaging ring has a recess on an outer wall thereof. The recess is adapted for pass of the locking block.

The inner body has a threaded portion and a groove on an outer wall thereof. The inner body has a central protrusion at one end thereof and an opening around the periphery of the protrusion. An oil seal is provided in the groove. Another end of the inner body is connected with a connection pipe. The distal end of the connection pipe has a tapered ring. The protrusion is connected with a membrane member. The membrane member has a central through hole for insertion of the protrusion. The membrane member has a membrane sheet around the through hole.

The outer locking member is a hollow member. The outer locking member has an inner threaded portion at one end thereof and a locking recess on an outer wall thereof. The locking recess has an L shape. The locking recess is provided with a plurality of stoppers at two inner sides of the locking recess. Another end of the outer locking member has a sleeve. The sleeve has an inner engaging portion therein.

The connection pipe is further connected with an air pipe.

DETAILED DESCRIPTION OF THE PREFERRED EMBODIMENTS

Figure 1:
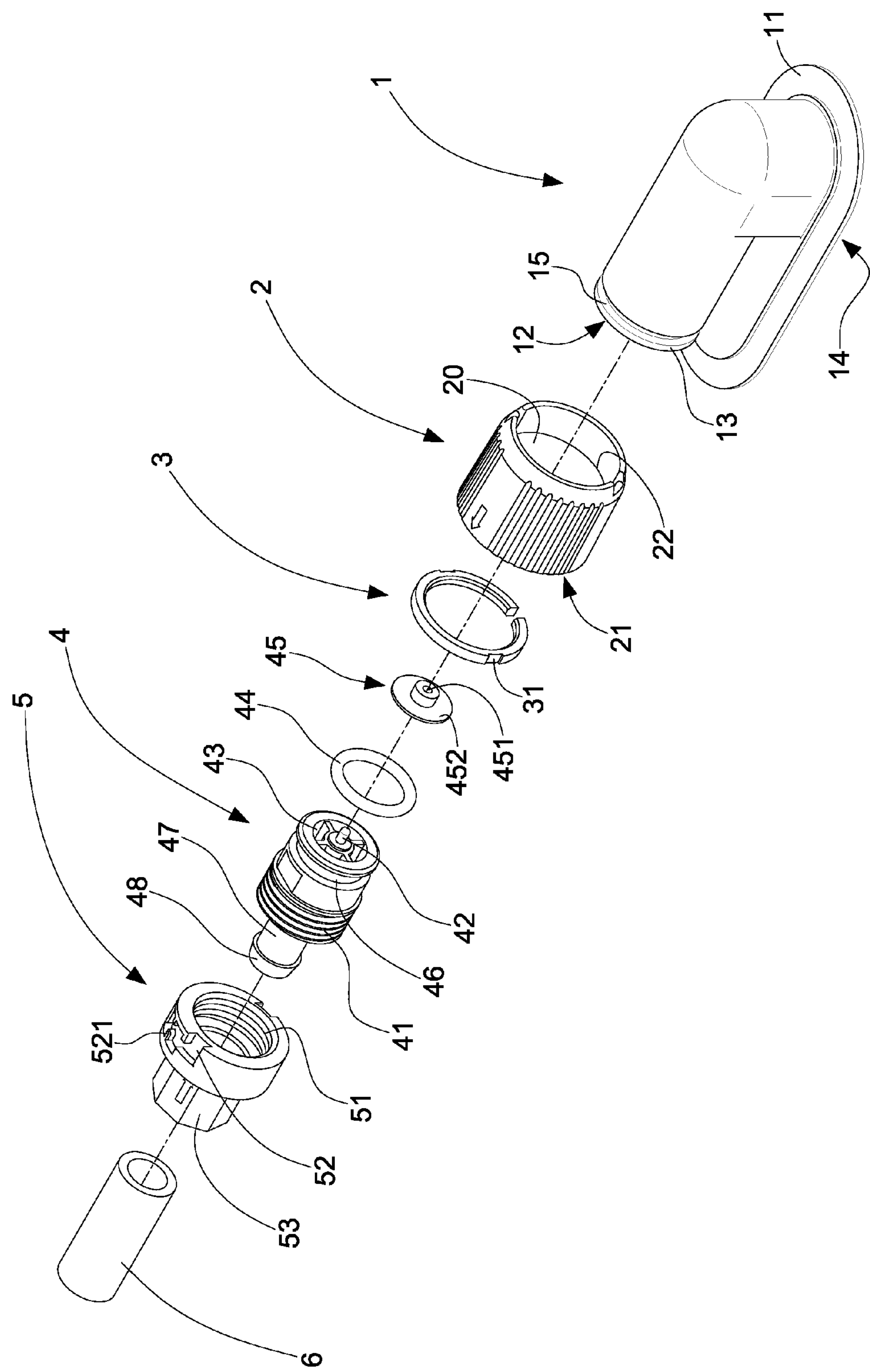
FIG. 1 is an exploded view according to a preferred embodiment of the present invention.
Figure 3:
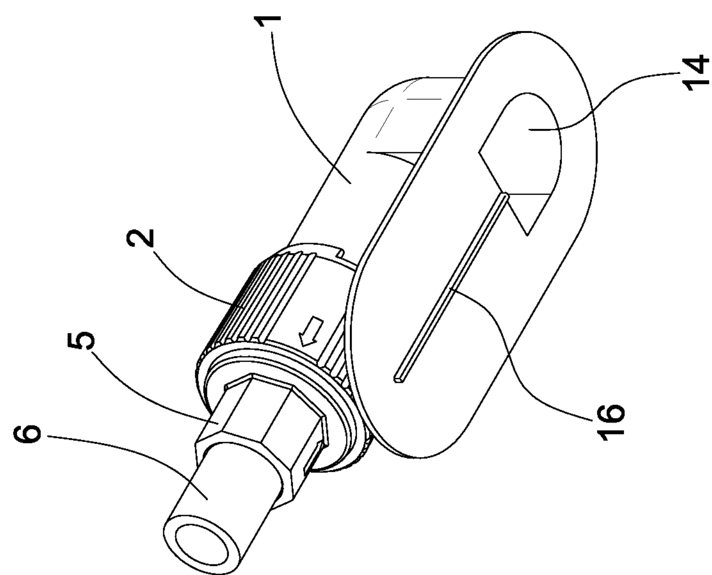
FIG. 3 is another perspective view according to the preferred embodiment of the present invention.
Figure 2:
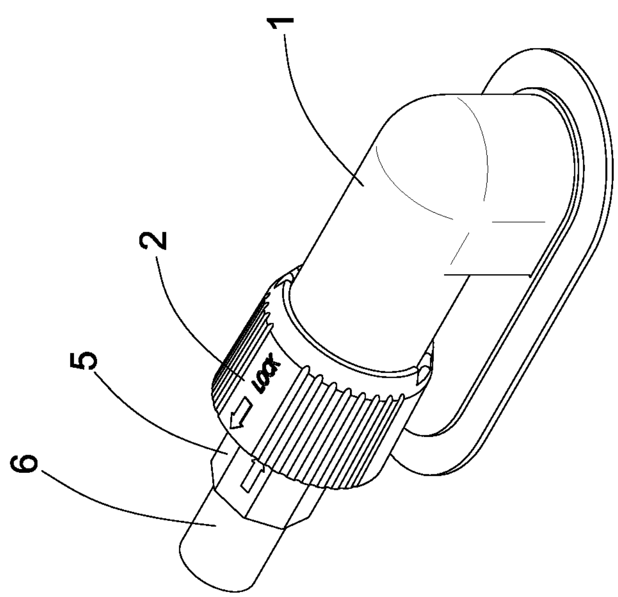
FIG. 2 is a perspective view according to the preferred embodiment of the present invention.

Embodiments of the present invention will now be described, by way of example only, with reference to the accompanying drawings.

As shown in FIG. 1 to FIG. 4, the quick connector of the present invention comprises an outer body 1, a locking member 2, an engaging ring 3, an inner body 4 and an outer locking member 5.

The outer body 1 has a press portion 11 at a bottom thereof. The outer body 1 has a passage 12 therein. The passage 12 has an L shape. Two ends of the passage 12 are a first connection opening 13 and a second connection opening 14. The outer body 1 has an annular groove 15 close to an outer edge of the first connection opening 13 and a rib 16 at the bottom of the outer body 1 next to the second connecting opening 14.

The locking member 2 has a space 20 therein and a locking block 21 in the space 20. The locking member 2 further has a stop ring 22 at an inner edge of the space 20.

The engaging ring 3 is disposed in the annular groove 15 of the outer body 1. The engaging ring 3 has a recess 31 on an outer wall thereof. The recess 31 is adapted for pass of the locking block 21.

The inner body 4 has a threaded portion 41 and a groove 46 on an outer wall thereof. The inner body 4 has a central protrusion 42 at one end thereof and an opening 34 around the periphery of the protrusion 42. An oil seal 44 is provided in the groove 46. Another end of the inner body 4 is connected with a connection pipe 47. The distal end of the connection pipe 47 has a tapered ring 48. The protrusion 42 is connected with a membrane member 5. The membrane member 5 has a central through hole 451 for insertion of the protrusion 42. The membrane member 5 has a membrane sheet 452 around the through hole 451.

The outer locking member 5 is a hollow member. The outer locking member 5 has an inner threaded portion 51 at one end thereof and a locking recess 52 on an outer wall thereof. The locking recess 52 has an L shape. The locking recess 52 is provided with a plurality of stoppers 521 at two inner sides of the locking recess 52. Another end of the outer locking member 5 has a sleeve 53. The sleeve 53 has an inner engaging portion 54 therein.

To assemble the present invention, the oil seal 44 is first inserted in the groove 46 and the membrane member 45 is connected to the protrusion 42. An air pipe 6 is inserted through the outer locking member 5 and connected to the connection pipe 47. After that, the outer locking member 5 is screwed to the inner body 4. The locking member 2 is connected to the first connection opening 13 of the outer body 1, and the engaging ring 3 is located in the annular groove 15. The locking block 21 of the locking member 2 is engaged in the locking recess 52 to complete the assembly.

Figure 4:
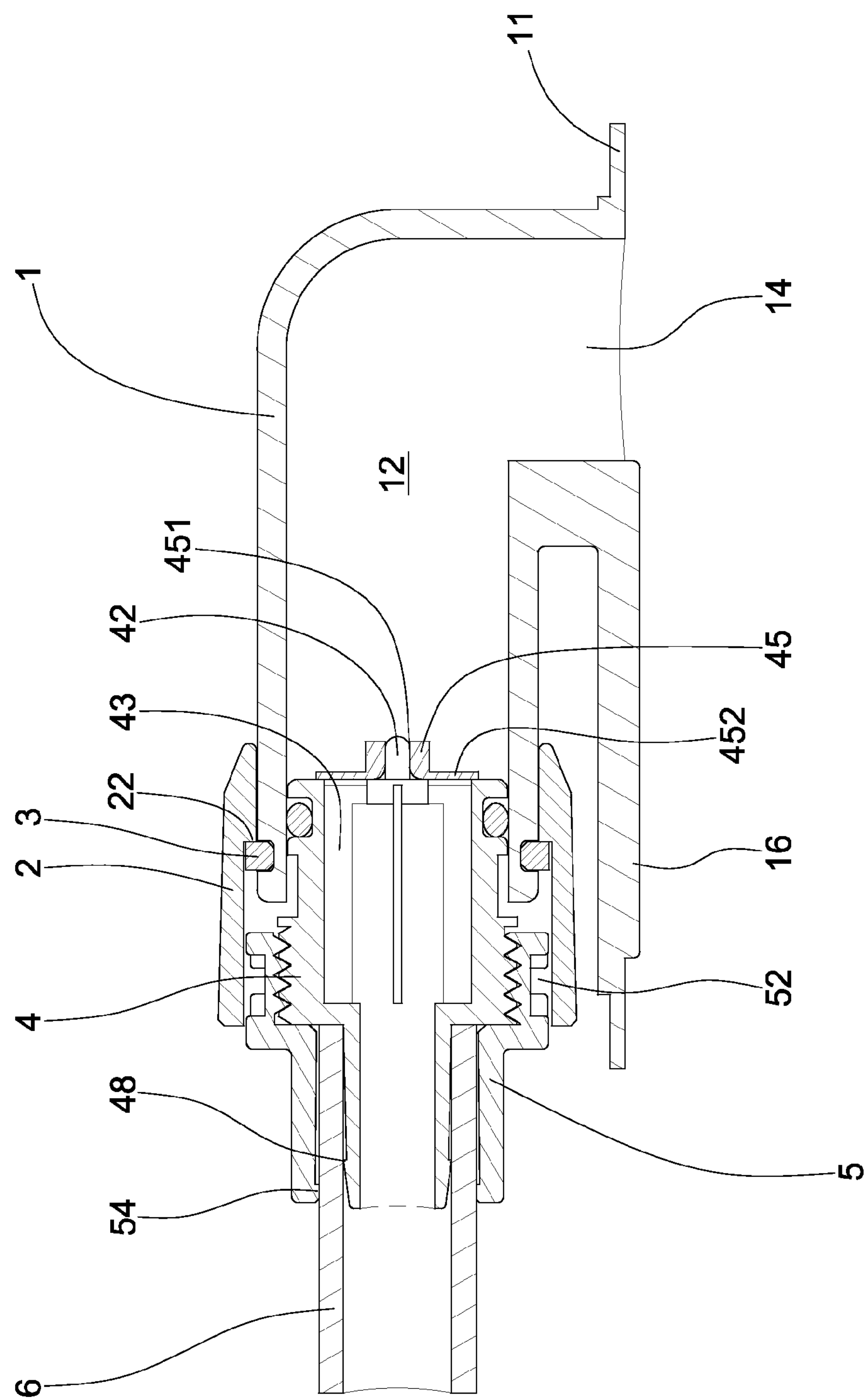
FIG. 4 is a sectional view according to the preferred embodiment of the present invention.

As shown in FIG. 4, the air pipe 6 is connected between the inner engaging portion 54 and the tapered ring 48 to be secured thereat, so that the air pipe 6 is tightly connected to the connection pipe 47 without disengagement.

Figure 5:
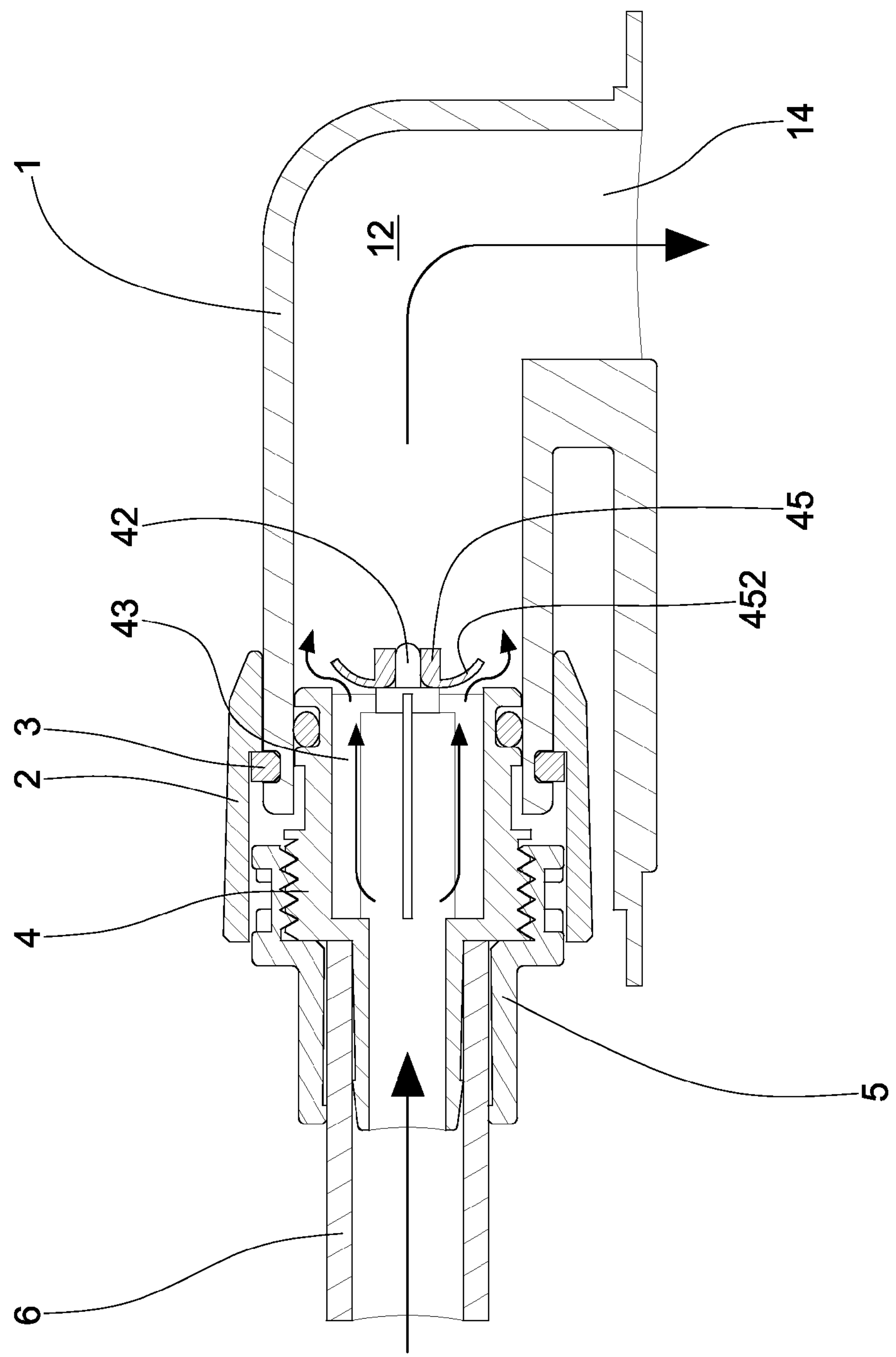
FIG. 5 is a sectional view showing air flow according to the preferred embodiment of the present invention.

As shown in FIG. 5, when air flows to the quick connector of the present invention through the air pipe 6, the flow will push the membrane sheet 452 of the membrane member 45 and the membrane sheet 452 will be deformed so that the opening 43 is in an open state. The air flow can flow to the outer body 1 through the opening 43 and then flow out from the second connection opening 14.

Figure 6:
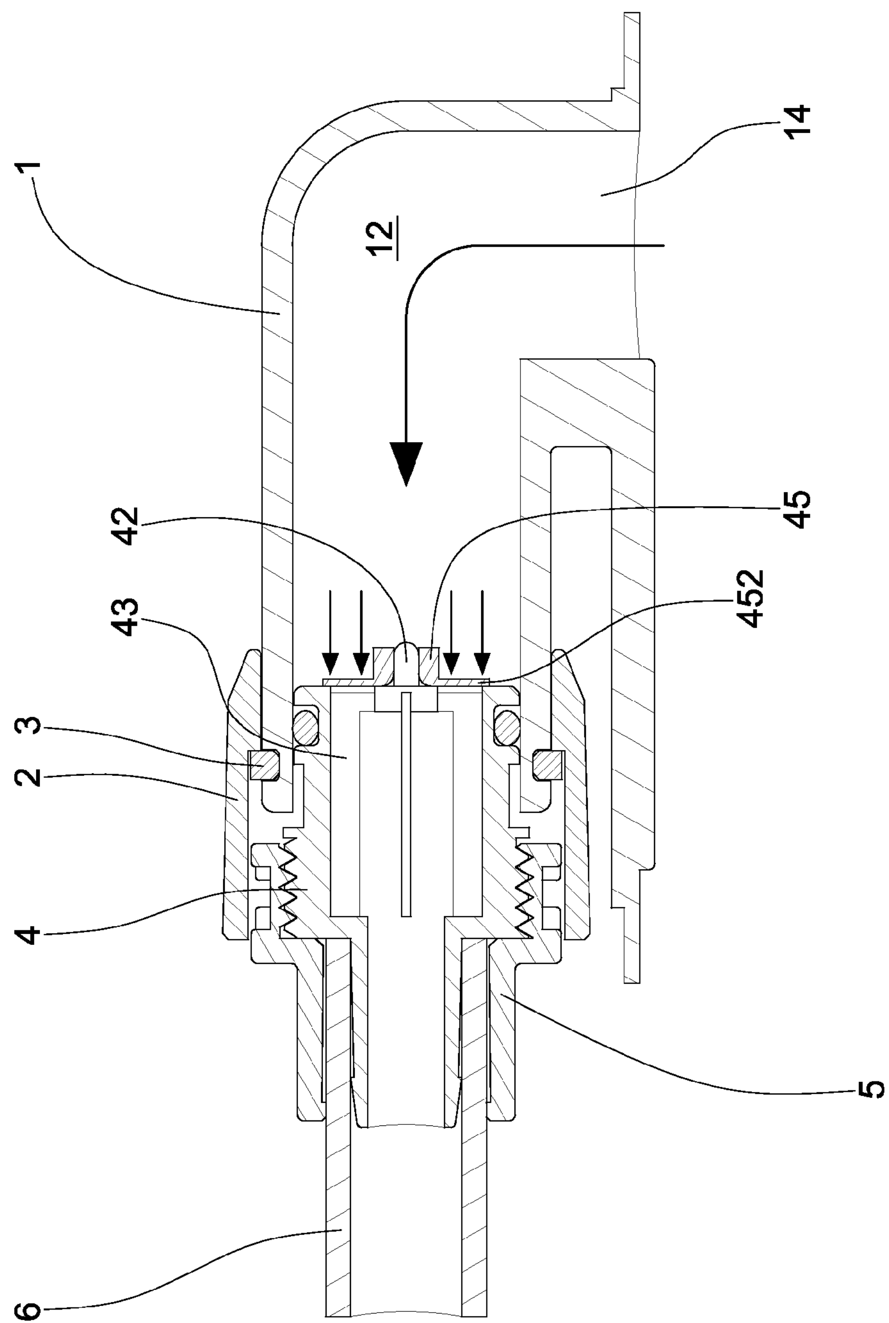
FIG. 6 is a sectional view showing reverse air flow to be stopped according to the preferred embodiment of the present invention.

As shown in FIG. 6, when air flows to the quick connector of the present invention through the second connection opening 14 to meet the membrane member 45, the air will push the membrane sheet 452 of the membrane member 45 to cover the opening 43 so that the opening 43 is sealed by the membrane sheet 452 of the membrane member 45. The membrane member 45 provides a check valve function so that the air cannot pass the opening 43.

Figure 7:
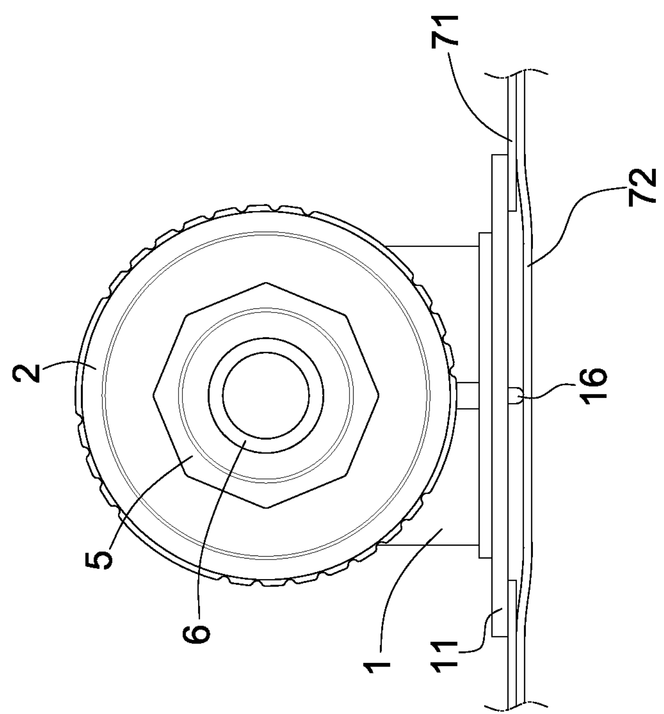
FIG. 7 is a schematic view showing the rib adapted to prevent the second connection opening from being closed according to the preferred embodiment of the present invention.

As shown in FIG. 7, the present invention has the rib 16 at the bottom of the outer body 1 next to the second connecting opening 14. When the present invention is not provided with the membrane member 45 for a special demand, the rib 16 is used to prevent the second opening 14 from being closed by the lower body 72 of the air cushion bed to ensure operation of an emergency air extraction.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A quick connector having a check device, comprising:

an inner body, the inner body having a protrusion at one end thereof and an opening next to the protrusion, the protrusion being connected with a membrane member, the membrane member having a through hole for insertion of the protrusion, the membrane member further having a membrane sheet, the membrane sheet being adapted to cover the opening; and further comprising an outer body, a locking member, an engaging ring and an outer locking member;

the outer body having a passage therein, the passage having an L shape, two ends of the passage being a first connection opening and a second connection opening, the outer body having an annular groove close to an outer edge of the first connection opening;

the locking member having a space therein and a locking block in the space, the locking member further having a stop ring at an inner edge of the space;

the engaging ring being disposed in the annular groove of the outer body;

the inner body having a threaded portion and a groove on an outer wall thereof, an oil seal being provided in the groove, another end of the inner body being connected with a connection pipe;

the outer locking member being a hollow member, the outer locking member having an inner threaded portion at one end thereof and a locking recess on an outer wall thereof, the locking recess having an L shape, the locking recess being provided with a plurality of stoppers at two inner sides of the locking recess, another end of the outer locking member having a sleeve.

2. The quick connector having a check device as claimed in claim 1, wherein the protrusion is disposed at a central portion of the end of the inner body.

3. The quick connector having a check device as claimed in claim 2, wherein the through hole is disposed at a central portion of the membrane member.

4. The quick connector having a check device as claimed in claim 1, wherein the opening is disposed around the protrusion.

5. The quick connector having a check device as claimed in claim 3, wherein the membrane sheet is disposed around the through hole of the membrane member.

6. The quick connector having a check device as claimed in claim 1, wherein the outer body has a press portion at a bottom thereof and a rib at the bottom of the outer body next to the second connecting opening.

7. The quick connector having a check device as claimed in claim 1, wherein the engaging ring has a recess on an outer wall thereof.

8. The quick connector having a check device as claimed in claim 1, wherein a distal end of the connection pipe has a tapered ring.

9. The quick connector having a check device as claimed in claim 1, wherein the sleeve of the outer locking member has an inner engaging portion therein.

* * * * *